(12) United States Patent
Yoo et al.

(10) Patent No.: US 6,864,009 B2
(45) Date of Patent: Mar. 8, 2005

(54) SINGLE CELL AND STACK STRUCTURE FOR SOLID OXIDE FUEL CELL STACKS

(75) Inventors: Young Sung Yoo, Taejeon (KR); Young Hee Han, Taejeon (KR); Thae Kapp Kang, Taejeon (KR)

(73) Assignee: Korea Electric Power Co., Seoul (KR)

( * ) Notice: Subject to any disclaimer, the term of this patent is extended or adjusted under 35 U.S.C. 154(b) by 0 days.

(21) Appl. No.: 10/419,372

(22) Filed: Apr. 21, 2003

(65) Prior Publication Data

US 2003/0175573 A1 Sep. 18, 2003

Related U.S. Application Data

(62) Division of application No. 09/522,284, filed on Mar. 9, 2000, now Pat. No. 6,593,020.

(30) Foreign Application Priority Data

Mar. 9, 1999 (KR) .......................................... 1999-7764

(51) Int. Cl.[7] .............................................. H01M 2/00
(52) U.S. Cl. .............................. 429/34; 429/33; 429/35; 429/38
(58) Field of Search .............................. 429/30, 33, 32, 429/34, 35, 38, 40

(56) References Cited

U.S. PATENT DOCUMENTS

| 5,770,327 A | 6/1998 | Barnett et al. |
| 5,882,809 A | * 3/1999 | McPheeters et al. .......... 429/30 |
| 6,296,962 B1 | 10/2001 | Minh |

* cited by examiner

Primary Examiner—Raymond Alejandro
(74) Attorney, Agent, or Firm—Perkins Coie LLP

(57) ABSTRACT

A single cell and stack structure for SOFC stacks is disclosed. The single cell consists of a fuel electrode, an electrolyte and an air electrode, with opposite two or four sides of said single cell is shaped while being bent downwardly, thus forming an electrode support type structure or a self-support (electrolyte support) type structure each having a reversed U-shaped cross-section. In the SOFC stack structure, electrode support type or self-support type single cells are gastightly stacked on a separating plate while being held on a plurality of sealing grooves sealed with sealant.

8 Claims, 10 Drawing Sheets

[FIG 1a]
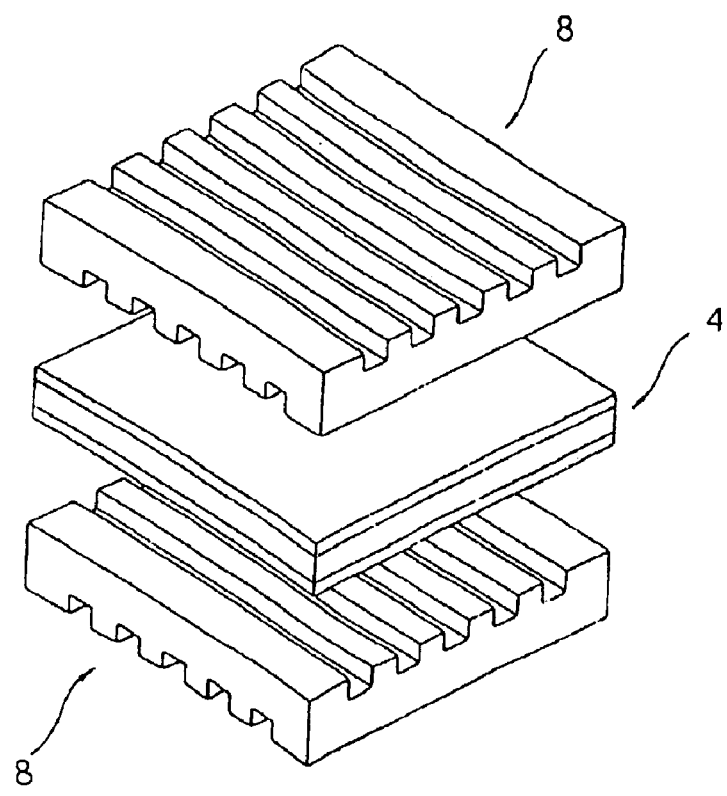
Prior Art
[FIG 1b]
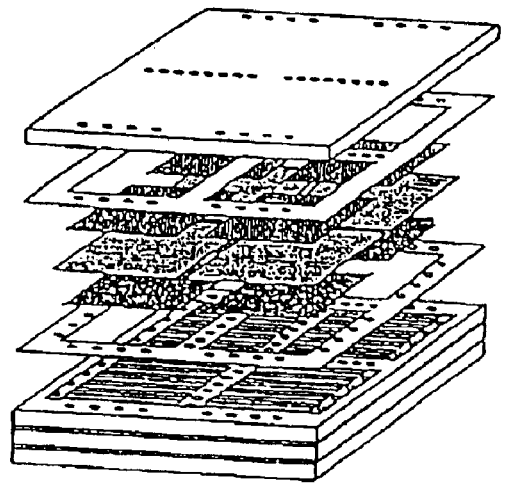
Prior Art

[FIG 2a]
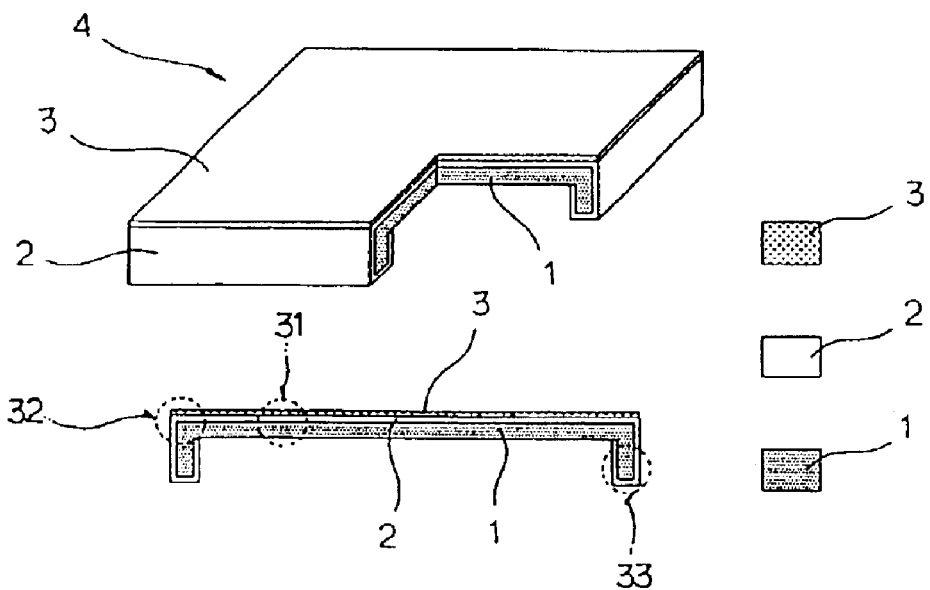
[FIG 2b]
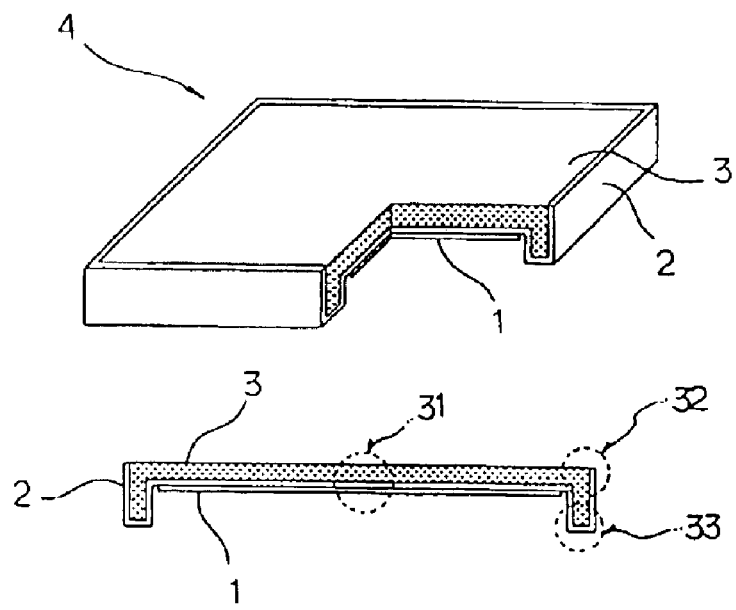

[FIG 2c]
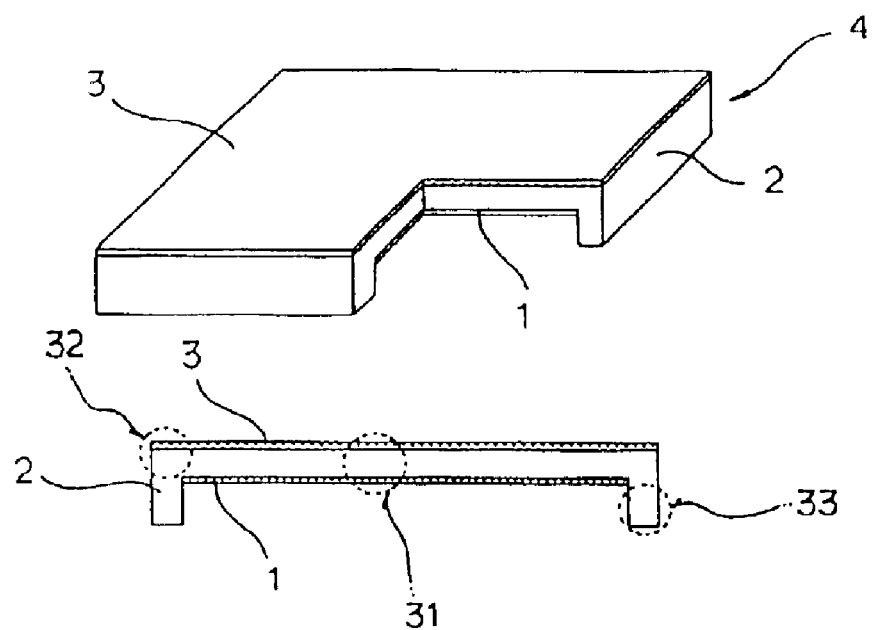

[FIG 3]
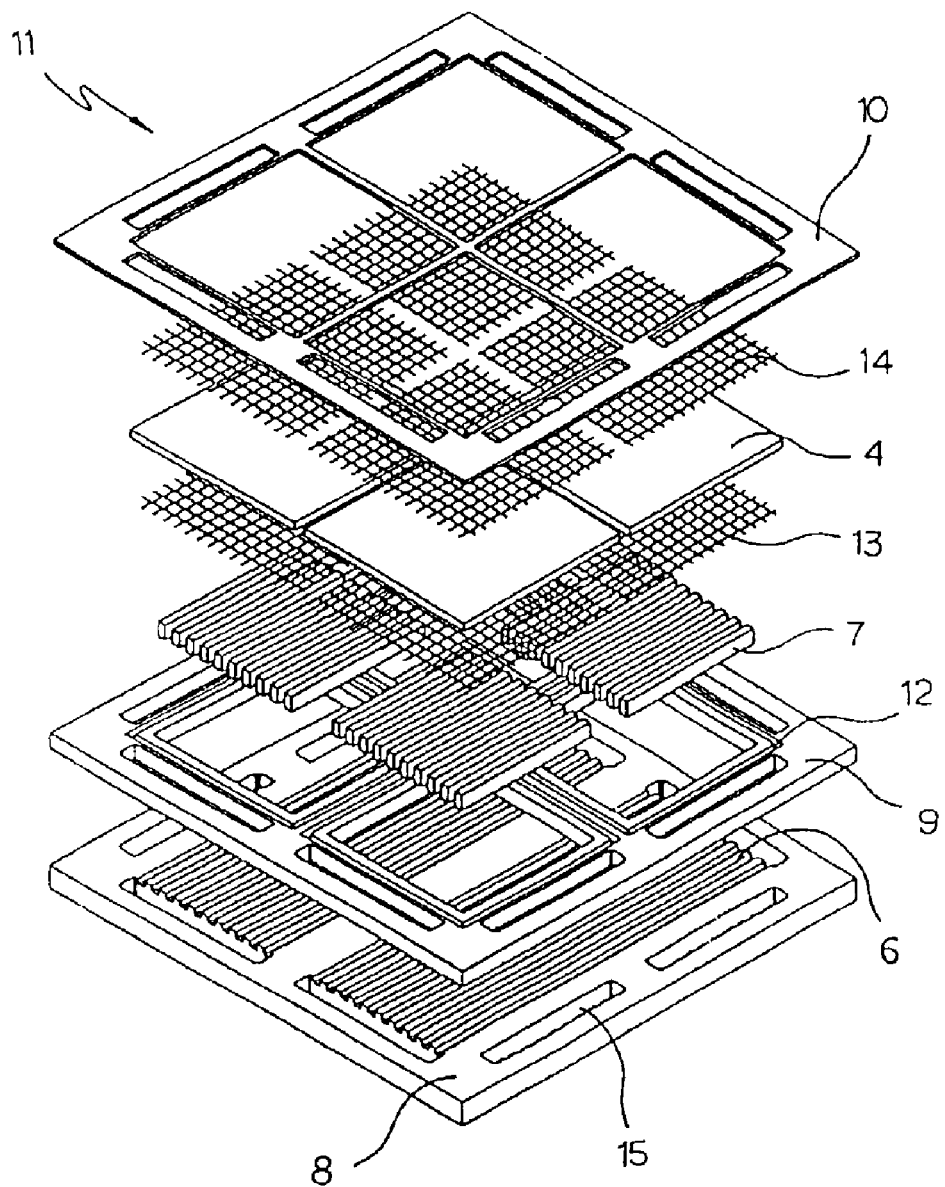

[FIG 4]
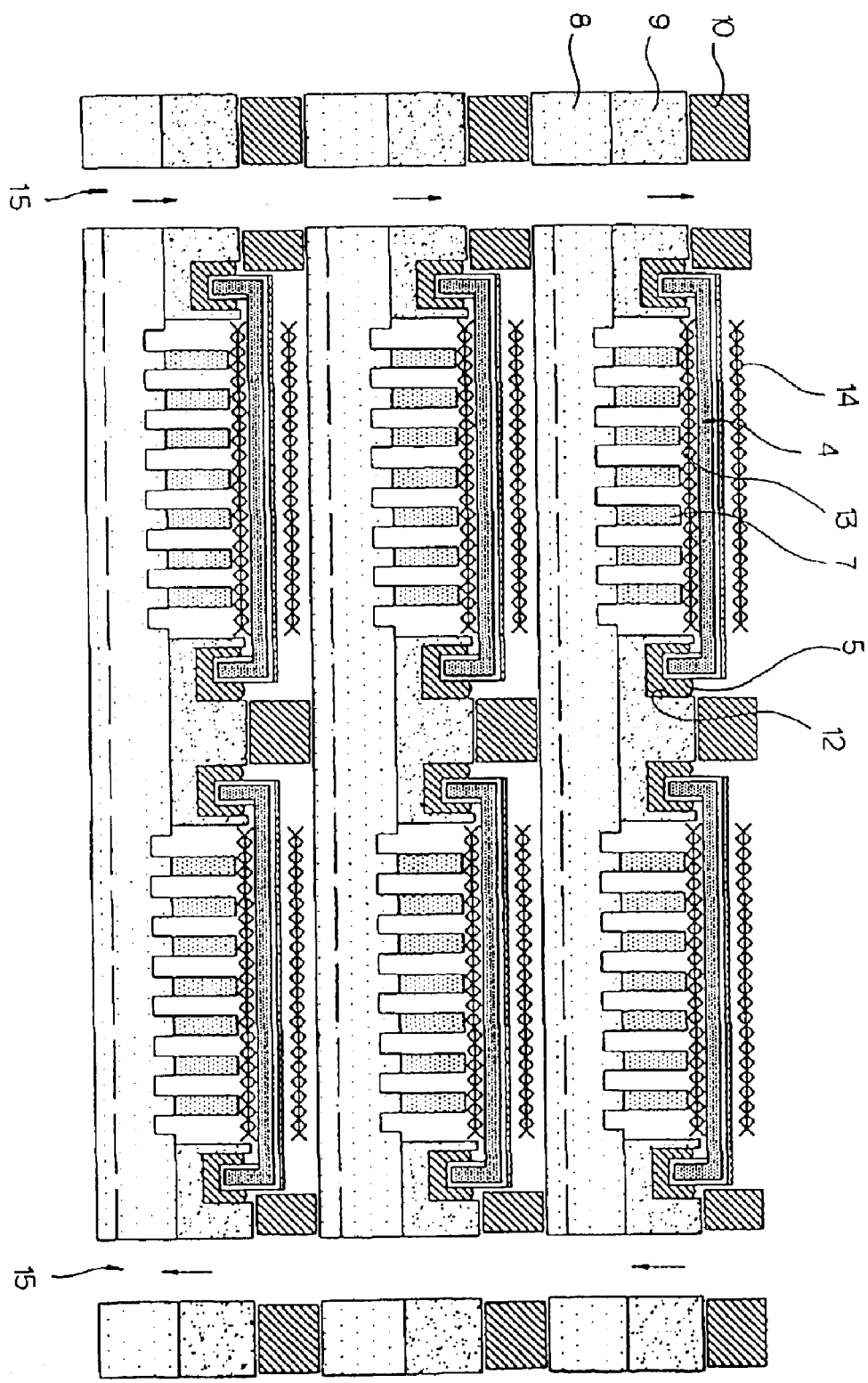

[FIG 5]
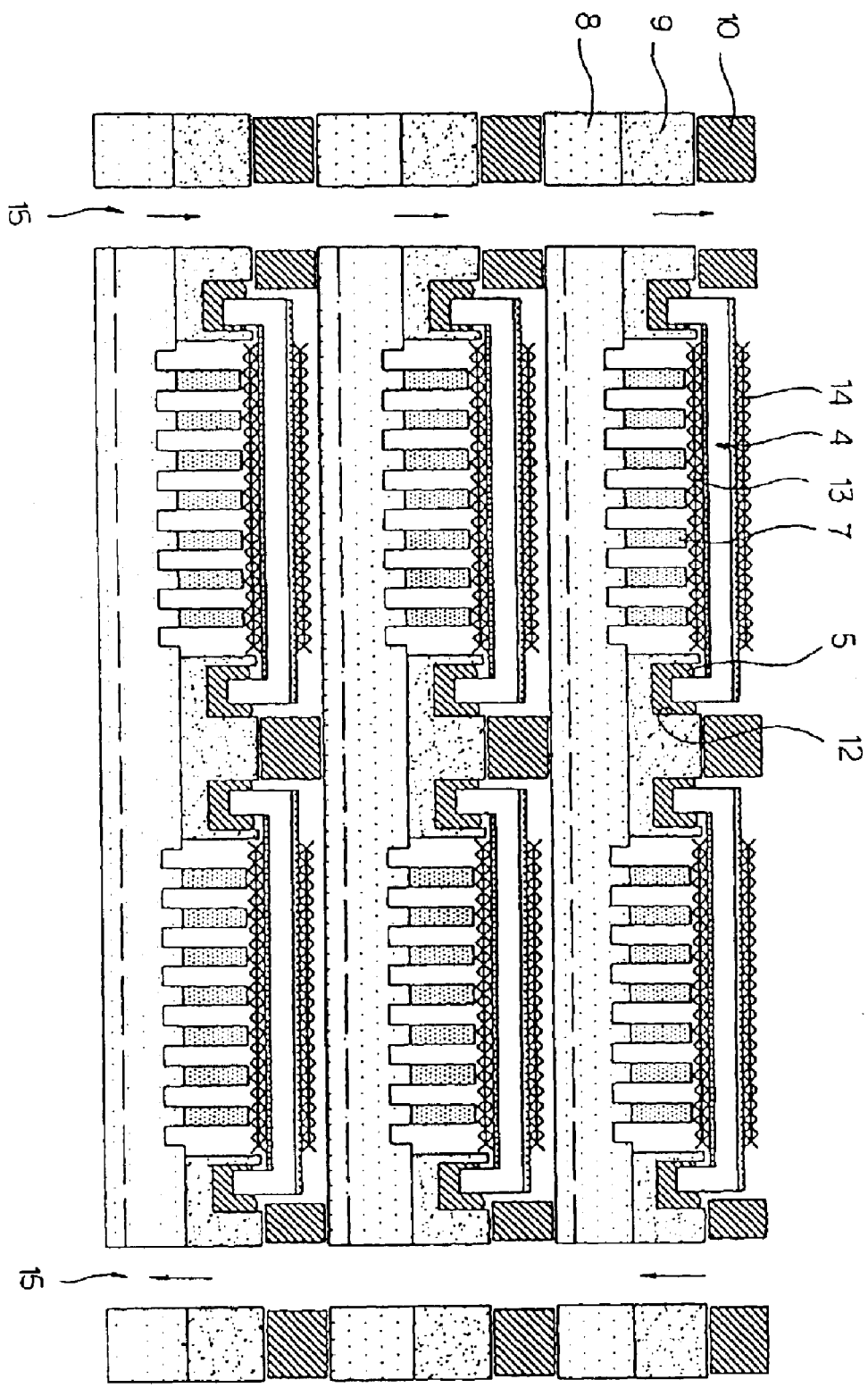

[FIG 6]
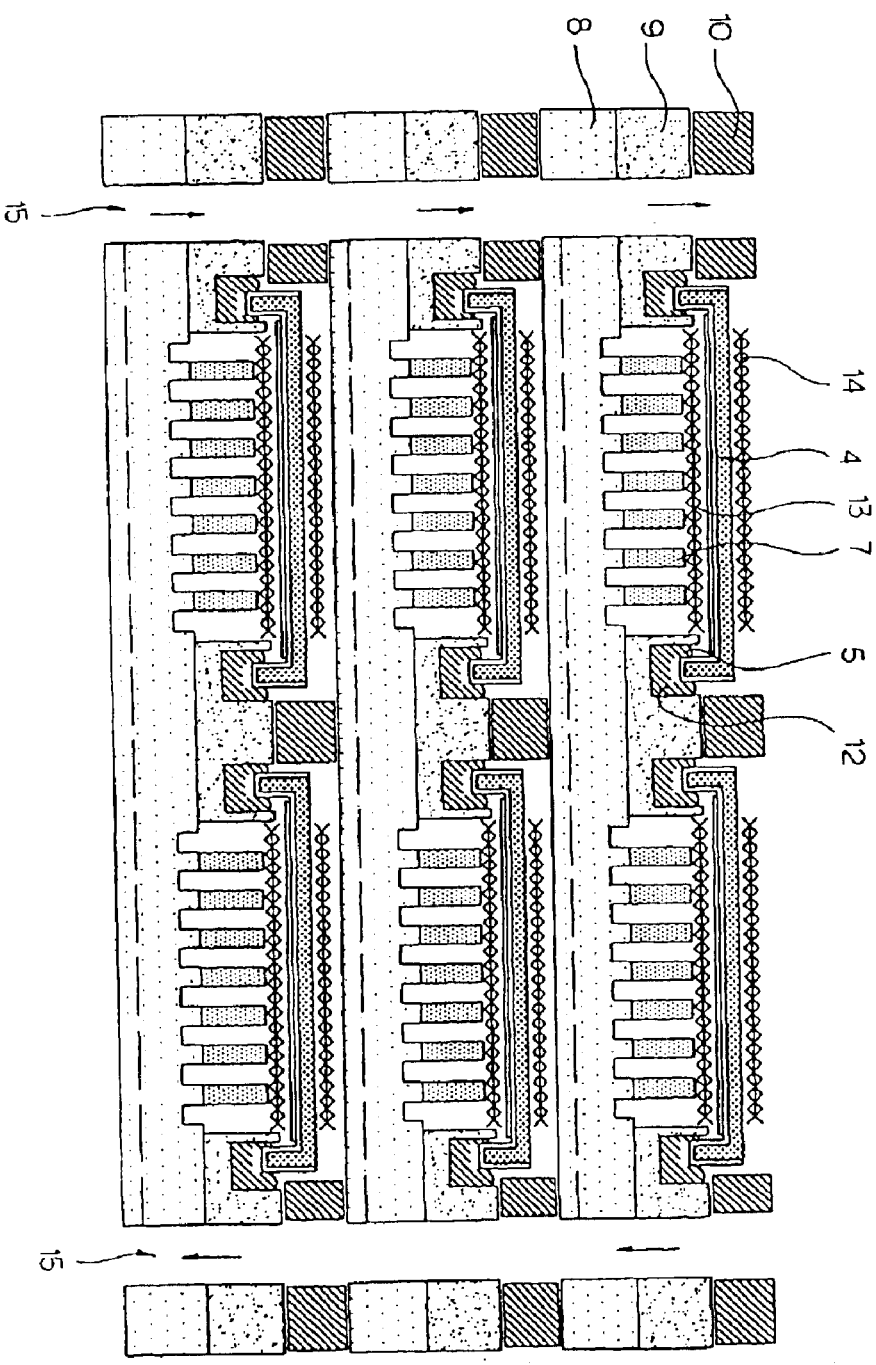

[FIG 7a]
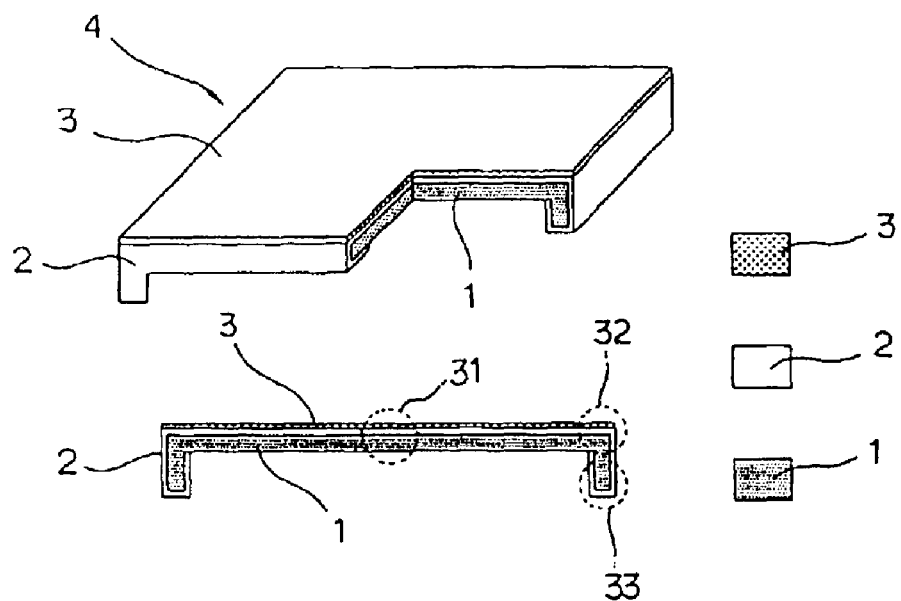
[FIG 7b]
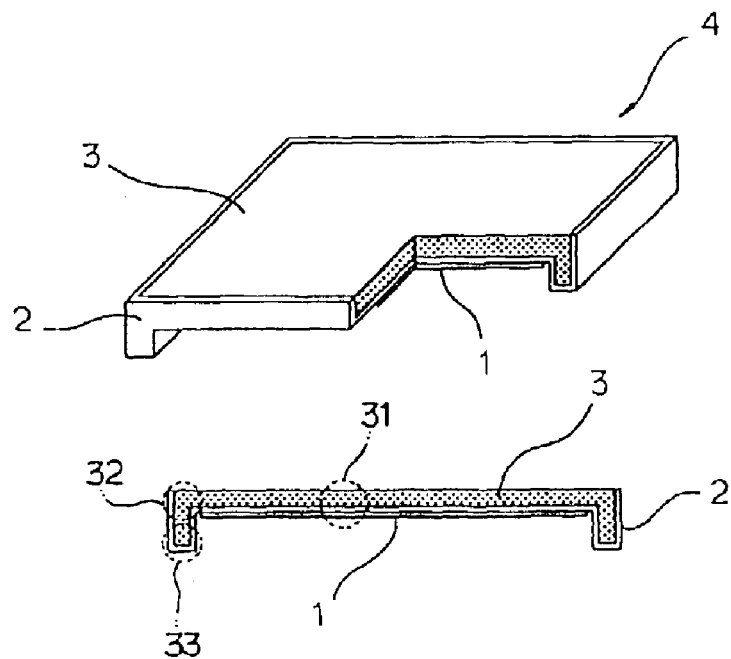

[FIG 7c]
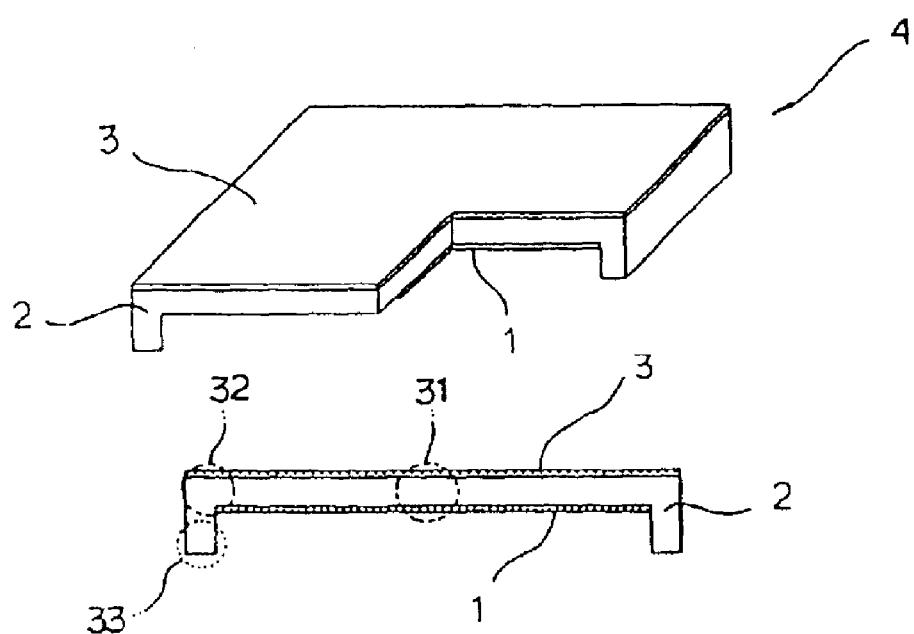

[FIG 8]
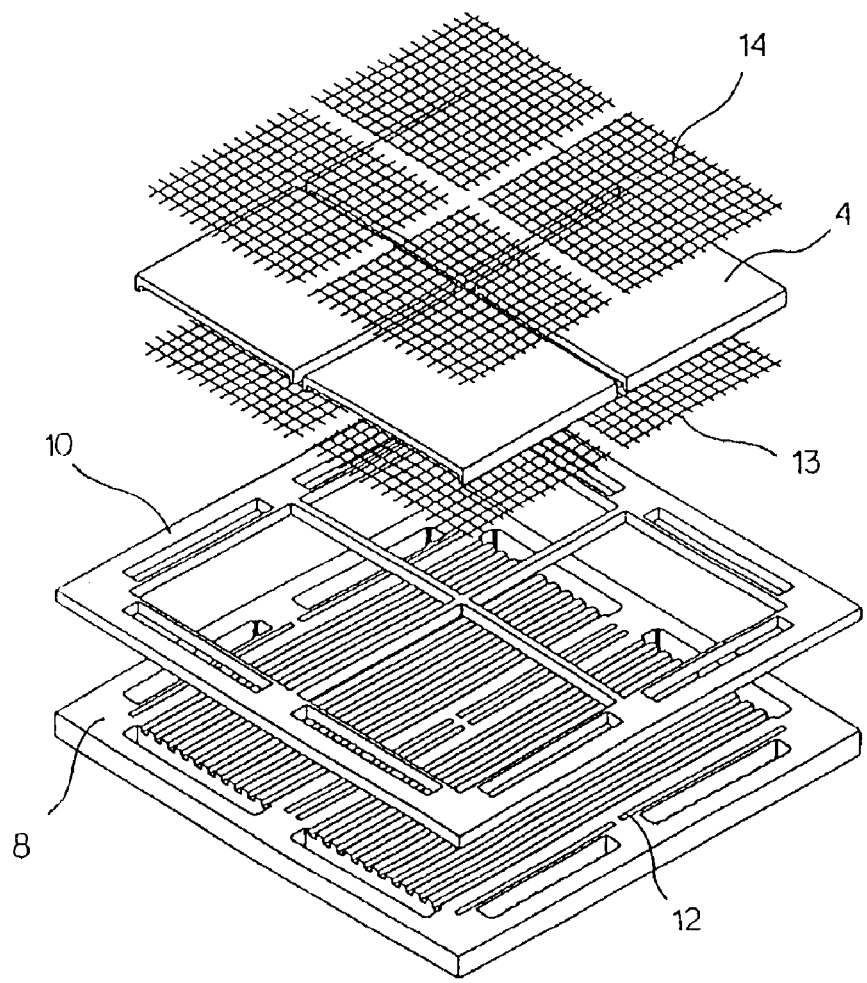

SINGLE CELL AND STACK STRUCTURE FOR SOLID OXIDE FUEL CELL STACKS

The present application claims benefit pursuant to 35 U.S.C. § 120 and is a divisional of U.S. application Ser. No. 09/522,284 (U.S. Pat. No. 6,593,020), entitled "Single Cell and Stack Structure For Solid Oxide Fuel Cell Stacks," filed Mar. 9, 2000, which claims priority under 35 U.S.C. § 119 from Korean Patent Application No. 1999-7764, filed Mar. 9, 1999, both are incorporated herein in their entirety by reference.

BACKGROUND OF THE INVENTION

1. Field of the Invention

The present invention relates, in general, to solid oxide fuel cells and, more particularly, to a single cell for solid oxide fuel cell stacks, being shaped while being bent downwardly at opposite two or four sides of the cell to form an electrode support type structure or a self-support (electrolyte support) type structure each having a reversed U-shaped cross-section, the present invention also relating to a solid oxide fuel cell stack structure with such single cells being gastightly stacked on a separating plate at a plurality of sealing grooves of the plate sealed with sealant.

2. Description of the Prior Art

As well known to those skilled in the art, fuel cells are designed to accomplish a smooth flow of reaction gases to two electrodes (i.e., anode and cathode), to bring the two electrodes into electric contact with an electrolyte substrate, and to accomplish a gastight sealing effect between the reaction gases. The fuel cells thus induce an ionic conduction from the electrodes toward the dense electrolyte substrate and create an electrochemical reaction in the electrodes, thereby forming electromotive force and finally generating electric power using the electromotive force.

In recent years, solid oxide fuel cells (hereinbelow, referred to simply as "SOFC") have been proposed and used while being so-called "a third generation fuel cell". In such an SOFC, a thermochemically stable metal oxide is used as the material of an electrolyte substrate, with a fuel electrode (anode) and an air electrode (cathode) being respectively attached to both (lower and upper) sides of the electrolyte substrate. Such an SOFC somewhat freely uses a variety of fuel gases, such as $H_2$, $CH_4$, $CH_3OH$, etc., without reforming the fuel gases, and uses air or oxygen as an oxidant, thus effectively accomplishing a highly efficient and low pollution power plant.

A conventional SOFC stack consists of a fuel electrode (anode) (Ni—YSZ cermet), an electrolyte [doped zirconia ($ZrO_2+8Y_2O_3$), doped ceria ($CeO_2$), doped bismuth oxide ($Bi_2O_3$), doped perovskite], an air electrode ($LaSrMnO_3$), a separating plate or an interconnector ($Cr-5Fe-1Y_2O_3$, Ni-based metal, $LaSrCrO_3$), a current collector, and a sealant (glass or glass-ceramic). The above-mentioned elements are assembled into a desired SOFC stack. The SOFC stack is also assembled with peripheral equipment, thus accomplishing a desired power generating system.

Such an SOFC stack includes a plurality of single cells, each consisting of an electrolyte substrate with a fuel electrode as a negative electrode (anode) and an air electrode as a positive electrode (cathode) being attached to both sides of the electrolyte. In order to effectively create a desired electrochemical reaction in the two electrodes, the electrodes each preferably have a porous structure. In addition, the electrolyte substrate, or the intermediate layer of the single cell, preferably has a dense structure which does not allow fuel gas or oxidizing gas to permeate into the electrolyte or to be mixed together.

When such single cells are stacked into a desired SOFC stack, the single cells are positioned between two separating plates. In such a case, it is necessary to form a desired gastight sealing structure using a sealant, such as glass or glass-ceramic, within the stack so as to prevent two different gases from being mixed together while flowing along opposite gas channels of the separating plates. It is also necessary to design the SOFC stack to allow a smooth gas supply for the opposite electrodes of each single cell. In addition, an insulating layer or an insulating plate, made of a sealing and insulating material, is provided on an area of the upper separating plate, with the area being free from the single cells.

Conventionally, the SOFCs are classified into three types, such as a tubular type, a planar type and a monolithic type. Of the three types, the tubular type SOFC is the well-known type SOFC. However, such a tubular type SOFC is problematic in that it is very difficult to produce and is less likely to be practically used.

A known method of producing such a tubular type SOFC may be referred to a Minh's report (N. Q. Minh, J. Am. Ceram. Soc., 76[3] p 563–588, 1993). As disclosed in the above Minh's report, a porous electrode support in the form of a tube having a length of 2 mm is primarily produced through an extrusion process. Thereafter, a porous electrode layer is formed on the porous tubular support through a slurry coating process. In addition, both a desired electrolyte layer and a desired interconnector are formed through an EVD process (electrochemical vapor deposition process), thus producing a desired tubular type SOFC. The tubular type SOFC is somewhat advantageous in that it is easy and simple to accomplish both a desired gas sealing effect and an interconnection of single cells while stacking the tubular type SOFCs into an SOFC stack. However, the tubular type SOFC is problematic in that it has a low power density in comparison with the planar type SOFC or the monolithic type SOFC. In addition, it is necessary to enlarge the size and volume of EVD equipment in proportion to the length of a desired tubular type SOFC. This finally forces the EVD equipment to be large-sized and increases the equipment cost. Furthermore, a multi-step process has to be used for producing such a tubular type SOFC, thus increasing the production cost of single cells. Therefore, the tubular type SOFC will be less likely to be practically used.

Different from the tubular type SOFC and the monolithic type SOFC, the planar type SOFC is advantageous in that the electrolyte thin substrate having a thickness of 200 $\mu m$ may be made of inexpensive conventional ceramic, thus being suitable for production in commercial quantity. Such a planar type SOFC also effectively improves the power density to an extent which cannot be expected from the tubular type SOFC or the monolithic type SOFC due to their structural disadvantages. In this regard, such planar type SOFCs rather than the tubular type SOFCs or the monolithic type SOFCs have been actively studied and developed recently.

Such planar type SOFCs are conventionally classified into electrode support type SOFCs and self-support (or electrolyte support) type SOFCs in accordance with the electrolyte, the electrode or the material. Of the two types, the self-support type (or electrolyte support type) SOFCs are more widely used rather than the electrode support type SOFCs. As shown in FIG. 1a, such a self-support type SOFC is produced by coating a positive electrode (cathode) layer and a negative electrode (anode) layer, each having a thickness of several ten micrometers, on both sides of an electrolyte substrate having a thickness of 200 μm. A known method of producing such a electrode support type SOFC may be referred to a Souza's report (S. de. Souza, J. Electrochem. Soc., 144[3] L35–L37, 1997). As disclosed in the above Souza's report, an electrolyte thin layer having a thickness of 20 μm is formed on a porous electrode support having a thickness of 1~2 mm, thus forming a desired electrode support type SOFC having a highly improved electric performance. When an SOFC stack is produced using such electrode support type single cells, it is possible to preferably reduce the operational temperature of the SOFC stack from 1,000° C. to about 800° C. Therefore, the planar type SOFCs have been actively studied and developed recently to provide improved electrode support type SOFCs.

In order to accomplish the recent trend of high power capacity of SOFC stacks, it is necessary to assemble an SOFC stack having an enlarged area and this forces the area of each single cell of the stack to be enlarged. However, the known technique of producing ceramic thin plates only provides a square electrolyte plate having a dimension of about 10×10 cm or about 20×20 cm, the electrolyte plate being used as an electrode support plate. Therefore, as disclosed in a Blum's report (L. Blum et al, Proceedings of the 4th Int. Symp. On SOFC, Vol 4, p 163–172, 1995), a grid array SOFC stack, having a desired size larger than that of each single cell, is preferably proposed to be used as a planar type SOFC stack. In such a grid array SOFC stack, a plurality of single cells having a size smaller than that of a separating plate are arrayed in parallel on the separating plate while accomplishing a highly gas sealing effect as shown in FIG. 1b. However, such a highly gas sealing effect is very difficult to be accomplished during the process of producing the grid array stack, and so the requirement for the highly gas sealing effect stands in the way of practical use of such planar type SOFCs. The requirement for the highly gas sealing effect of the planar type SOFC stacks is very important since it directly determines the durability and expected life span of such stacks.

SUMMARY OF THE INVENTION

Accordingly, the present invention has been made keeping in mind the above problems occurring in the prior art, and an object of the present invention is to provide a single cell for SOFC stacks, is shaped while being bent downwardly at opposite two or four sides of the cell to form an electrode support type structure or a self-support (electorlyte support) type structure each having a reversed U-shaped cross-section.

Another object of the present invention is to provide an SOFC stack structure, with electrode support type or self-support type single cells being gastightly stacked on a separating plate while being held on a plurality of sealing grooves sealed with sealant.

In order to accomplish the above object, the present invention provides a single cell for SOFC stacks, comprising a fuel electrode, an electrolyte and an air electrode, which is shaped while being bent downwardly at opposite two or four sides of the cell to form an electrode support type single cell or a self-support type single cell each having a reversed U-shaped cross-section.

The present invention also provides an SOFC stack structure, with electrode support type or self-support (electrolyte support) type single cells being gastightly stacked on a separating plate while being held on a plurality of sealing grooves sealed with sealant.

In the SOFC stack of this invention, the fuel gas and the oxidizing gas are free from being mixed together due to an improved gas sealing structure. The SOFC stack is thus free from the stress due to a difference in coefficient of thermal expansion between the single cells and the separating plate when the temperature of the stack is raised or lowered. Since the sealant is stably kept within the sealing grooves regardless of an environmental change, the SOFC stack is stably operated without being affected in performance when the temperature of the stack is raised or lowered. When the SOFC stack is assembled, the bent support portions of the single cells are precisely seated in the sealing grooves of the separating plate. The single cells are thus stably held within the SOFC stack irrespective of external impact or thermal stress. This finally lengthens the expected life span of the SOFC stack, improves the durability and the operational reliability of the stack, and allows a user to more easily repair the stack when necessary.

BRIEF DESCRIPTION OF THE DRAWINGS

The above and other objects, features and other advantages of the present invention will be more clearly understood from the following detailed description taken in conjunction with the accompanying drawings, in which:

FIG. 1a is an exploded perspective view, schematically showing the construction of a conventional simple planar, self-support (elctrolyte support) type single cell for SOFC stacks;

FIG. 1b is an exploded perspective view, schematically showing the construction of a grid array SOFC stack with a plurality of conventional single cells of FIG. 1a;

FIG. 2a is a view, schematically showing the construction of a fuel electrode (anode) support type single cell for SOFC stacks in accordance with the primary embodiment of the present invention, with the four sides of the cell being bent downwardly to form a reversed U-shaped cross-section of the cell;

FIG. 2b is a view, schematically showing the construction of an air electrode (cathode) support type single cell for SOFC stacks in accordance with the second embodiment of this invention, with the four sides of the cell being bent downwardly to form a reversed U-shaped cross-section of the cell;

FIG. 2c is a view, schematically showing the construction of a self-support (electrolyte support) type single cell for SOFC stacks in accordance with the third embodiment of this invention, with the four sides of the cell being bent downwardly to form a reversed U-shaped cross-section of the cell;

FIG. 3 is an exploded perspective view, schematically showing the construction of a grid array SOFC stack assembled using a plurality of four-side bent single cells of this invention;

FIG. 4 is a sectional view, schematically showing the construction of a grid array SOFC stack assembled using the fuel electrode (anode) support type single cells of FIG. 2a;

FIG. 5 is a sectional view, schematically showing the construction of a grid array SOFC stack assembled using the air electrode (cathode) support type single cells of FIG. 2b;

FIG. 6 is a sectional view, schematically showing the construction of a grid array SOFC stack assembled using the self-support (electrolyte support) type single cells of FIG. 2c;

FIG. 7a is a view, schematically showing the construction of a fuel electrode (anode) support type single cell for SOFC stacks in accordance with the fourth embodiment of the present invention, with opposite two sides of the cell being bent downwardly to form a reversed U-shaped cross-section of the cell;

FIG. 7b is a view, schematically showing the construction of an air electrode (cathode) support type single cell for SOFC stacks in accordance with the fifth embodiment of this invention, with opposite two sides of the cell being bent downwardly to form a reversed U-shaped cross-section of the cell;

FIG. 7c is a view, schematically showing the construction of a self-support (electrolyte support) type single cell for SOFC stacks in accordance with the sixth embodiment of this invention, with opposite two sides of the cell being bent downwardly to form a reversed U-shaped cross-section of the cell; and FIG. 8 is an exploded perspective view, schematically showing the construction of a grid array SOFC stack assembled using a plurality of two-side bent single cells of this invention.

DESCRIPTION OF THE PREFERRED EMBODIMENTS

FIGS. 2a to 8 show single cells and stack structures for SOFC stacks in accordance with the preferred embodiments of the present invention. As shown in the drawings, the present invention provides a fuel electrode (anode) support type single cell, an air electrode (cathode) support type single cell, and a self-support (electrolyte support) type single cell for SOFC stacks. The present invention also provides an SOFC stack structure having the above-mentioned single cells.

In a fuel electrode support type single cell 4 of FIG. 2a, a porous fuel electrode 1, or an anode having a thickness of 1~2 mm, is shaped while being bent downwardly at two or four opposite sides to form a reversed U-shaped cross-section, with a planar top portion 31, a corner portion 32 and a bent support portion 33. An electrolyte thin layer 2, having a dense structure with a thickness of 10~50 µm, is coated on the top surface of the planar portion 31 and on the external surfaces of the corner and support portions 32 and 33 of the fuel electrode 1. Thereafter, an air electrode, or a cathode having a porous structure, is coated on the top planar surface of the electrolyte thin layer 2. In a brief description, the fuel electrode support type single cell 4 of FIG. 2a is a triple-layered single cell, with the electrolyte middle layer 2, the fuel electrode lower layer 1 and the air electrode upper layer 3. On the other hand, an air electrode support type single cell 4 of FIG. 2b has a profile similar to that of the cell of FIG. 2a, with the positions of the fuel electrode layer 1 and the air electrode layer 3 being reversed from those of the primary embodiment.

In a self-support (electrolyte support) type single cell 4 of FIG. 2c, a dense structural electrolyte layer 2 having a thickness of 100~300 µm is shaped while being bent downwardly (at right angles) at two or four opposite sides to form a reversed U-shaped cross-section. A porous fuel electrode (anode) layer 1 is coated on the lower surface of the electrolyte layer 2, while an porous air electrode (cathode) layer 3 is coated on the top surface of the electrolyte layer 2. The self-support type single cell 4 has a triple-layered structure. The single cells of FIGS. 2a to 2c are used for producing an SOFC stack structure 11 of FIG. 3. In the SOFC stack structure 11 of FIG. 3, a plurality of gas channels 6 are formed on a first separating plate 8, while a plurality of channel supports 7 are positioned on the gas channels 6 with the single cells 4 being stacked on the channel supports 7 in the stack 11. In order to assemble the bent support portions 33 of the single cells 4 with a second separating plate 9, a plurality of sealing grooves 12 are formed on the second separating plate 9. Each of the sealing grooves 12 has a shape corresponding to the profile of the support portion 33 of each single cell 4. A sealant 5 is filled in the grooves 12 prior to seating the bent support portions 33 of the single cells 4 within the grooves 12. Thereafter, an insulating plate 10 is laid on the second separating plate 9 while surrounding the single cells 4 and accomplishing a desired sealing effect between the insulating plate 10 and the second separating plate 9, thus forming a desired SOFC stack structure 11. In the present invention, a plurality of stack structures 11 with one being laid on top of another, thus forming a desired SOFC stack.

A better understanding of the present invention may be obtained through the following examples which are set forth to illustrate, but are not to be construed as the limit of the present invention.

EXAMPLE 1

A Process of Producing a Fuel Electrode (Anode) Support Type Single Cell Which is Bent Downwardly at Four Sides, and a Process of Producing an SOFC Stack Using Such Single Cells In order to produce a desired fuel electrode (anode) support type single cell, NiO powder and yttria stabilized zirconia power ($ZrO_2+8Y_2O_3$, 8YSZ) were primarily mixed together at a weight ratio of 50:50, thus preparing a powder mixture. Thereafter, 20% graphite powder was mixed with the powder mixture, thus forming a starting material for substrates. A porous substrate, or a fuel electrode layer 1 having a porosity of 40%, was produced using the starting material. In such a case, the porous substrate 1 had a shape of FIG. 2a, was sintered ultimately into a square size of 55×55 mm, with a thickness of a square portion 31 of 1~2 mm, an outside height of a bent support portion 33 of about 3 mm, an inside height of the bent support portion 33 of about 1~2 mm, and a thickness of the bent support portion 33 of about 1~2 mm.

Thereafter, an electrolyte, selected from doped zirconia ($ZrO_2$), doped ceria ($CeO_2$), doped bismuth oxide ($Bi_2O_3$), doped perovskite and a mixture thereof, was coated on the substrate 1 through a conventional slurry coating process or a chemical vapor deposition process prior to performing a heating treatment, thus finally forming a dense electrolyte layer 2 having a thickness of 10~50 µm. In such a case, the electrolyte layer 2 was coated on the top surface of the planar portion 31 of the substrate 1 and on the external surfaces of the corner and support portions 32 and 33 of the substrate 1 as shown in FIG. 2a, thus preventing a direct gas leakage from the porous substrate 1. Therefore, it has been possible to prevent an undesirable reduction in the sealing effect of a resulting single cell 4 when a sealant was brought into contact and reacted with the electrode layers 1 and 3.

As shown in FIG. 2a, an air electrode 3, or a cathode, was printed on the top surface of the planar portion 31 of the electrolyte layer 2 using LSM ($La_{0.8}Sr_{0.2}MnO_3$) powder prior to performing a heat treatment, thus producing a fuel electrode (anode) support type single cell 4 for SOFC stacks.

In order to produce an SOFC stack using the fuel electrode support type single cells 4, two metal separating plates, or first and second separating plates 8 and 9, were used. The two separating plates 8 and 9 respectively had fuel gas channels and oxidizing gas channels, which extended across each other with the single cells 4 being interposed between the fuel gas channels and the oxidizing gas channels within a resulting stack. In addition, a ceramic insulating plate 10 was interposed between two separating plates 8 and 9 of neighboring stack structures at a position corresponding to an area free from the single cells 4. Of the two separating plates 8 and 9, the second one 9, interposed between the first one 8 and the insulating plate 10 as shown in FIGS. 3 and 4, had a plurality of pockets or sealing grooves 12 for seating the bent support portions 33 of the single cells 4. When the separating plates 8 and 9 and the insulating plate 10 were assembled together, a small amount of sealant was applied to the junctions between the two separating plates 8 and 9 and the insulating plate 10, thus preventing a gas leakage from the junctions at an operational temperature of the SOFC stack. As best seen in FIG. 4, the sealing grooves 12 of the second separating plate 8 were sized to have a clearance of 1~2 mm inside and outside the bent support portion 33 of each single cell 4, and were deeper than the inside height of the bent support portion 33 by 0.5~1 mm.

Therefore, in the case of using single cells 4 of 50×50 mm, the sealing grooves 12 of the second separating plate 9 had an inside width of 43 mm, an outside width of 53 mm, a groove width of 5 mm, and a depth of about 1.5~2.5 mm. The thickness of the second separating plate 9 of a resulting SOFC stack was increased in proportion to the depth of the grooves 12, and so it was necessary to design the second separating plate 9 to have as small a thickness as possible. While assembling a desired SOFC stack, a sealant was filled within the sealing grooves 12 of the second separating plate 9 prior to placing the bent support portions 33 of the single cells 4 within the grooves 12. Such a stacking process was repeated to completely produce a desired SOFC stack.

In such a case, two conventional collectors, or first and second collectors 13 and 14, were used to bring the air electrode 3 and the fuel electrode 1 of each single cell 4 into electric contact with the first separating plate 8 of a neighbouring stack structure and the channel support 7 or the second separating plate 9 of this stack structure, respectively. A thin gauze of about 50 mesh, made of Ni, was used as the first collector 13 positioned around the fuel electrode 1 of each single cell 4. On the other hand, a porous conductive ceramic plate, having the same component as that of the cathode 3 or ceramic separating plates of each single cell 4 and being inexpensive in comparison with a meshy gauze made of a noble metal, such as Pt, was used as the second collector 14 positioned around the air electrode 3.

In order to accomplish a desired electric contact of the fuel electrode 1 of each single cell 4 with the gas channels of the first separating plate 8, it was necessary to make the gas channel structure thicker than that of an SOFC stack using the conventional planar type single cells of FIG. 1a. Such a thick gas channel structure was accomplished by making the gas channel area of the first separating plate 8 thicker than the other areas of the plate 8. It was also possible to more simply make the desired thick gas channel structure by setting a separate channel support having a smaller size than the width between the bent support portions 33 of each single cell 4 within the stack as shown in FIG. 3. In such a case, the gas channels 6 of the first separating plate 8 were effectively brought into electric contact with the fuel electrode 1 of each single cell 4.

Therefore, in the SOFC stack structure 11 having the fuel electrode support type single cells 4 of this Example, the separating plates 8 and 9 are somewhat thicker than those of a conventional SOFC stack structure. However, the SOFC stack structure 11 of this invention is advantageous in that it has an improved gas sealing effect, effectively relieves the stress due to a difference in coefficient of thermal expansion, and stably fixes the position of the single cells 4 within the SOFC stack.

EXAMPLE 2

A Process of Producing a Air Electrode (Cathode) Support Type Single Cell Which is Bent Downwardly at Four Sides, and a Process of Producing an SOFC Stack Using Such Single Cells In order to produce a desired air electrode support type single cell 4, LSM ($La_{0.8}Sr_{0.2}MnO_3$) powder was mixed with graphite powder prior to performing conventional forming and heat treating processes, thus forming a porous substrate, or an air electrode layer 3 having a porosity of 40%. In such a case, the porous cathode substrate 3 had a shape shown in FIG. 2b, with a square size of 55×55 mm, a thickness of a square portion 31 of 1~2 mm, an outside height of a bent support portion 33 of about 3 mm, an inside height of the bent support portion 33 of about 1~2 mm, and a thickness of the bent support portion 33 of about 1~2 mm. Thereafter, an electrolyte layer 2 was formed on the porous substrate 3 in the same manner as that described for Example 1. In addition, the lower surface of the electrolyte layer 2 was printed with a starting material, which was made by primarily mixing NiO powder with yttria stabilized zirconia power ($ZrO_2+8Y_2O_3$, 8YSZ) at a weight ratio of 50:50 and by secondarily mixing 20% graphite powder with the powder mixture, in the same manner as that described for Example 1, thus forming a fuel electrode layer 1. An air electrode (cathode) support type single cell 4 of FIG. 2b was produced.

Thereafter, an SOFC stack of FIGS. 3 and 5 was produced using the air electrode support type single cells 4 of FIG. 2b. In this example, the remaining steps of producing the stack were the same as those of Example 1.

EXAMPLE 3

A Process of Producing a Self-Support (Electrolyte Support) Type Single Cell Which is Bent Downwardly at Four Sides, and a Process of Producing an SOFC Stack Using Such Single Cells In order to produce a desired self-support (electrolyte support) type single cell 4, an electrolyte layer 2 having the shape of FIG. 2c was primarily formed using a starting material, or granule powder having a size of 20~30 μm and being selected from doped zirconia ($ZrO_2$), doped ceria ($CeO_2$), doped bismuth oxide ($Bi_2O_3$), doped perovskite and a mixture thereof. Thereafter, the electrolyte layer 2 was sintered. The electrolyte layer 2 had ultimately a square size of 50×50 mm, a thickness of a square portion 31 of 150 μm, an inside height of the bent support portion 33 of 2 mm, and a thickness of the bent support portion 33 of about 150~1000 μm. In such a case, it was also possible to make the thickness of the bent support portion 33 be 150 μm equal to that of the square portion or be 1~2 mm in the same manner as that described for Example 1.

Thereafter, LSM ($La_{0.8}Sr_{0.2}MnO_3$) powder, or the material of the air electrode (cathode) layer 3, and NiO—YSZ, or the material of the fuel electrode (anode) layer 1, were printed on the upper and lower surfaces of the electrolyte layer 2 prior to performing a heat treating process, thus forming a desired self-support type single cell 4 for SOFC stacks.

In addition, an SOFC stack was produced using the self-support type single cells 4 of FIG. 2c and two metal separating plates 8 and 9. In such a case, the two metal separating plates 8 and 9 were arrayed in a way such that the fuel gas channels and the oxidizing gas channels of the two plates 8 and 9 extended across each other with the single cells 4 being interposed between the fuel gas channels and the oxidizing gas channels. In addition, a ceramic insulating plate 10 was set between two separating plates 8 and 9 of neighbouring stack structures 11 at a position corresponding to an area free from the single cells 4, thus forming a desired SOFC stack. In the SOFC stack of this Example, it has been possible to reduce the thickness (volume) of the insulating plate 10 by the thickness of the self-support type single cells thinner than the single cells of Example 1. In this example 3, the remaining steps of producing the SOFC stack were the same as those of Example 1.

EXAMPLE 4

A Process of Producing an SOFC Stack Without Sealing the Insulating Plate at a Position Corresponding to the Gap Between the Single Cells Since each insulating plate 10 of each stack structure 11 of FIG. 3 was brought into contact with the first separating plate 8 of an upper stack structure at its upper surface and with a second separating plate 9 at its lower surface, the insulating plate 10 was set within the SOFC stack with a sealant being applied to both sides of the insulating plate 10. The insulating plate 10 of Examples 1 to 3 thus accomplished a constant flow of oxidizing gas in addition to a desired oxidizing gas sealing effect during an operation of the SOFC stack at a high temperature. However, in the SOFC stack, such an oxidizing gas sealing structure of the insulating plate 10 was not more important than the fuel gas sealing structure provided by the first and second separating plates 8 and 9. Therefore, even though the oxidizing gas sealing structure of the insulating plate 10 was formed by sealing the gas manifold area around the edge of the insulating plate 10, the oxidizing gas sealing structure was free from badly or seriously affecting the operational performance of a resulting SOFC stack. Therefore, in this example 4, the resulting SOFC stack was produced while limitedly sealing both the edge and the gas manifold area of the insulating plate 10 without sealing the cross-shaped gap between the single cells 4. In the SOFC stack of this Example 4, it was easy to separate the plates 8, 9 and 10 from each prior to repairing. In this example 4, the remaining steps of producing the SOFC stack were the same as those of Examples 1, 2 and 3.

EXAMPLE 5

A Process of Producing an SOFC Stack With Interconnected Sealing Grooves

In order to reduce the number of sealing grooves 12 in the electrode support type single cells of Examples 1 and 2 and in the self-support (electrolyte support) type single cell of Example 3, the SOFC stack of this Example 5 was produced using a second separating plate 9 with the sealing grooves 12 being interconnected into a single groove. In such a second separating plate 9, the interconnected sealing groove 12 had the same depth as that of Examples 1, 2 and 3, and the portion of the sealing groove 12 around the gas manifolds 15 had the same width, 5 mm, as that of Examples 1, 2 and 3. In addition, the portion of the interconnected sealing groove 12 around the single cells 4 had a width of above 10 mm, and so the resulting second separating plate 9 of this Example 5 was free from the steps between the sealing grooves 12 of FIGS. 4, 5 and 6. In this example 5, the remaining steps of producing the SOFC stack were the same as those of Examples 1, 2, 3 and 4.

EXAMPLE 6

A Process of Producing an SOFC Stack With a First Separating Plate Integrated With a Channel Support A desired SOFC stack of this Example was produced using a first separating plate 8 integrated with a channel support 7. The separating plate 8 integrated with the channel support 7 simplified the process of producing the SOFC stacks since it was possible to remove the necessity for separately forming the first separating plate 8 and the channel support 7. In this example 6, the remaining steps of producing the SOFC stack were the same as those of Examples 1, 2, 3, 4 and 5.

EXAMPLE 7

A Process of Producing an SOFC Stack With Both the Second Separating Plate and the Insulating Plate Being Made of the Same Material In the stacks of Examples 1, 2, 3, 4, 5 and 6, it was possible to made the second separating plate 9 using a nonconductive material different from the first separating plate 8. Therefore, the SOFC stack of this Example 7 was produced using a second separating plate 9 made of a ceramic material, free from a reaction with the sealant filled in the sealing grooves 12, rather than an expensive heat resisting metal. In this example 7, the remaining steps of producing the SOFC stack were the same as those of Examples 1, 2, 3, 4, 5 and 6.

EXAMPLE 8

A Process of Producing a Fuel Electrode (Anode) Support Type Single Cell Which is Bent Downwardly at Opposite Two Sides, and a Process of Producing an SOFC Stack Using Such Single Cells In order to produce a desired fuel electrode (anode) support type single cell 4, NiO powder and yittria stabilized zirconia power ($ZrO_2+8Y_2O_3$, 8YSZ) were mixed together at a weight ratio of 50:50, thus preparing a powder mixture. Thereafter, 20% graphite powder was mixed with the powder mixture, thus forming a starting material for porous substrates. A porous substrate, or a fuel electrode layer 1 having a porosity of 40%, was produced using the starting material. In such a case, the porous substrate 1 had a shape with opposite two sides being bent downwardly as shown in FIG. 7a. That is, the porous substrate 1 was sintered ultimately into a square size of 55×55 mm, a thickness of a square portion 31 of 1~2 mm, an outside height of a bent support portion 33 of about 3 mm, an inside height of the bent support portion 33 of about 1~2 mm, and a thickness of the bent support portion 33 of about 1~2 mm. Thereafter, an electrolyte, selected from doped zirconia ($ZrO_2$), doped ceria ($CeO_2$), doped bismuth oxide ($Bi_2O_3$), doped perovskite and a mixture thereof, was coated on the substrate 1 through a conventional slurry coating process or a chemical vapor deposition process prior to performing a heating treatment, thus forming a dense electrolyte layer 2 having a thickness of 10~50 μm. In the same manner as that described for Example 1, a porous air electrode (cathode) 3 was printed on the top surface of the electrolyte layer 2 prior to performing a heating treatment, thus producing a fuel electrode support type single cell 4 with opposite two sides being bent downwardly as shown in FIG. 7a.

A desired SOFC stack was produced using the single cells 4 of FIG. 7a. In the process of producing the SOFC stack, a separating plate 8, with a plurality of sealing grooves 12 having a shape corresponding to the profile of each single cell 4 and extending in parallel to the channels 6, was used. In this example, the SOFC stack was produced without using the separate channel support 7 and the second separating plate 9 different from the process of Example 1. The SOFC stack of this Example 8 had the construction shown in FIG. 8 (and referred to FIG. 4). This SOFC stack was reduced in height in comparison with the SOFC stack of FIG. 3 since the stack was free from the separate channel support 7 and the second separating plate 9. In this example, the remaining steps of producing the SOFC stack were the same as those of Example 1.

EXAMPLE 9

A Process of Producing an Air Electrode (Cathode) Support Type Single Cell Which is Bent Downwardly at Opposite Two Sides, and a Process of Producing an SOFC Stack Using Such Single Cells In order to produce a desired air electrode (cathode) support type single cell 4, LSM ($La_{0.8}Sr_{0.2}MnO_3$) powder was mixed with granule graphite powder prior to performing conventional forming and heat treating processes, thus forming a porous substrate, or an air electrode layer 3 having a porosity of 40%. In such a case, the porous substrate 3 had a shape with opposite two sides being bent as shown in FIG. 7b. The porous substrate 3 was sintered ultimately into a square size of 55×55 mm, a thickness of a square portion 31 of 1~2 mm, an outside height of a bent support portion 33 of about 3 mm, an inside height of the bent support portion 33 of about 1~2 mm, and a thickness of the bent support portion 33 of about 1~2 mm. Thereafter, an electrolyte, selected from doped zirconia ($ZrO_2$), doped ceria ($CeO_2$), doped bismuth oxide ($Bi_2O_3$), doped perovskite and a mixture thereof, was coated on the substrate 3 through a conventional slurry coating process or a chemical vapor deposition process prior to performing a heating treatment, thus forming a dense electrolyte layer 2 having a thickness of 10~50 μm. In addition, the lower surface of the electrolyte layer 2 was printed with a starting material, which was made by primarily mixing NiO powder with yttria stabilized zirconia power ($ZrO_2+8Y_2O_3$, 8YSZ) at a weight ratio of 50:50 and by secondarily mixing 20% graphite powder with the powder mixture, through the same printing process as that described for Example 1. Therefore, a desired air electrode support type single cell 4, with opposite two sides being bent downwardly as shown in FIG. 7b, was produced.

A desired SOFC stack was produced using the single cells 4 of FIG. 7b. The construction of the SOFC stack of this Example is shown in FIG. 8 (and referred to FIG. 5). In this example, the remaining steps of producing the SOFC stack were the same as those of Example 8.

EXAMPLE 10

A Process of Producing a Self-Support (Electrolyte Support) Type Single Cell Which is Bent Downwardly at Opposite Two Sides, and a Process of Producing an SOFC Stack Using Such Single Cells In order to produce a desired self-support (electrolyte support) type single cell 4, an electrolyte substrate 2 having the shape of FIG. 7c was primarily formed using a starting material, or granule powder having a size of 20~30 μm and being made of a material selected from doped zirconia ($ZrO_2$), doped ceria ($CeO_2$), doped bismuth oxide ($Bi_2O_3$), doped perovskite and a mixture thereof. Thereafter, the above substrate 2, bent downwardly at opposite two sides, was sintered. The electrolyte substrate 2 from the sintering process was prepared ultimately into a square size of 50×50 mm, a thickness of a square portion 31 of 150 μm, an inside height of the bent support portion 33 of 2 mm, and a thickness of the bent support portion 33 of about 150~1000 μm. In such a case, it was also possible to make the thickness of the bent support portion 33 be 150 μm equal to that of the square portion 31 or be 1~2 mm in the same manner as that described for Examples 8 and 9. Thereafter, LSM ($La_{0.8}Sr_{0.2}MnO_3$) powder, or the material of an air electrode (cathode) layer 3, and NiO—YSZ, or the material of a fuel electrode (anode) layer 1, were printed on the upper and lower surfaces of the electrolyte substrate 2 prior to performing a heat treating process, thus forming a desired self-support (electrolyte support) type single cell 4 with two porous electrode layers 1 and 3.

A desired SOFC stack was produced using the single cells 4 of FIG. 7c. The SOFC stack of this Example had a construction as shown in FIG. 8 (and referred to FIG. 6). In this example, the remaining steps of producing the SOFC stack were the same as those of Example 8.

EXAMPLE 11

A Process of Producing an SOFC Stack With an Improved Gas Channel Sealing Structure on Both an Insulating Plate and a Separating Plate In order to improve the sealing effect between the insulating plate 10 and the separating plate 8 while producing the SOFC stack of FIG. 8, a small amount of sealant was applied to the upper and lower surfaces of the plates 8 and 10. However, it was possible for the sealant to flow down into the fuel gas channels with the passage of time, thus undesirably disturbing a smooth gas flow within the channel or losing a desired sealing effect.

In an effort to overcome such a problem derived from the stacks of Examples 8, 9 and 10 with the gas channels passing perpendicularly at the junction between the single cells 4 on the separating plate 8, the SOFC stack of this Example 11 was produced while lowering the gas channel to a predetermined depth (example, a half depth of channel) with a plurality of flat plates or foot bridge plates having the same thickness of the depth and being positioned on the channels. Therefore, the sealing effect between the separating plate 8 and the insulating plate 10 of the stack was improved while accomplishing the desired smooth gas flow within the gas channels. In this example, the remaining steps of producing the SOFC stack were the same as those of Examples 8, 9 and 10.

EXAMPLE 12

A Process of Producing an SOFC Stack With a Reduced Number of Sealing Grooves Formed on the Separating Plate In order to reduce the number of sealing grooves (sealing pockets) on the separating plate 8 in the SOFC stacks of Examples 8, 9, 10 and 11, the stack of this Example 12 was produced, with the steps of the grooves 12 at positions between the single cells 4 being removed so as to at least partially integrate the sealing grooves 12 into a single groove 12. In such a case, the steps were removed from the positions corresponding to the junctions between the single cells 4 rather than the positions around the gas manifolds 15 without changing the depth of the sealing groove 12. Therefore, on the separating plate 8, the horizontally and/or vertically neighboring single cells 4 commonly used the sealing groove 12 having a width of 10 mm. In this example, the remaining steps of producing the SOFC stack were the same as those of Examples 8, 9, 10 and 11.

EXAMPLE 13

A Process of Producing an SOFC Stack With the Sealing Structure Being Removed from the Junction Between the Bent Support Portions of the Single Cells and the Insulating Plate In the SOFC stack of FIG. 8, it was possible to remove the cross-shaped portion from the central portion of the insulating plate 10 without affecting the functioning of the resulting stack. Therefore, the SOFC stack of this Example was produced using an insulating plate 10, with the cross-shaped portion being removed from the central portion of the insulating plate 10 rather than the portions around the bent support portions 33 of the single cells 4 or the portions around the gas manifold sealing edge of the insulating plate 10 different from the stacks of Examples 8, 9, 10, 11 and 12. In this example, the remaining steps of producing the SOFC stack were the same as those of Examples 8, 9, 10, 11 and 12.

As described above, the present invention provides a single cell and a stack structure for SOFC stacks. In the single cell, two or four opposite sides are bent downwardly to form an electrode support type structure or a self-support (electrolyte support) type structure each having a reversed U-shaped cross-section. The present invention also provides an SOFC stack structure, with such single cells being gastightly stacked on a separating plate having a plurality of sealing grooves sealed with sealant. In the SOFC stack of this invention, it is possible to prevent the fuel gas and the oxidizing gas from being mixed together while simply accomplishing a desired gas sealing effect. The SOFC stack is thus free from the stress due to a difference in coefficient of thermal expansion between the single cells and the separating plate when the temperature of the stack is raised or lowered. Since the sealant is stably kept within the sealing grooves regardless of an environmental change, it is possible to operate the SOFC stack while raising or lowering the temperature of the stack without affecting the functioning of the stack. When the SOFC stack of this invention is assembled, the bent support portions of the single cells are precisely seated in the sealing grooves (sealing pockets) of the separating plate. The single cells are thus stably held within the SOFC stack irrespective of external impact or thermal stress. Therefore, the present invention lengthens the expected life span of the SOFC stack, improves the durability and the operational reliability of the stack, and allows a user to more easily repair the stack when necessary.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solid oxide fuel cell stack structure comprising:
   a first separating plate having a plurality of gas channels;
   a second separating plate having a plurality of sealing grooves and being laid on the first separating plate;
   a plurality of channel supports seated on the gas channels of the first separating plate at positions within the second separating plate;
   a plurality of solid oxide fuel single cells each comprising a fuel electrode, an electrolyte and an air electrode, four sides of each single cell disposed downwardly so as to form a single cell having a reversed U-shaped cross-section, said single cells being seated on the second separating plate while being positioned on said channel supports with bent support portions of the single cells being held within the sealing grooves filled with a sealant;
   a first collector positioned between each of said channel supports and an associated single cell;
   a second collector positioned on each of said single cells; and
   an insulating plate laid on said second separating plate.

2. The solid oxide fuel cell stack structure according to claim 1, wherein said first and second separating plates and said insulating plate are sealed at their junctions by a sealant at positions around gas manifolds, at least a cross-shaped central portion and the whole of the insulating plate being removed in such manner that oxidizing gas channels between the single cells are not individually sealed.

3. The solid oxide fuel cell stack structure according to claim 1, wherein the sealing grooves of said second separating plate are interconnected together at least partially.

4. The solid oxide fuel cell stack structure according to claim 1, wherein said first separating plate is integrated with said channel support.

5. A solid oxide fuel cell stack structure comprising:
   a separating plate having a plurality of gas channels and a plurality of sealing grooves extending in parallel to the gas channels;
   a plurality of solid oxide fuel single cells each comprising a fuel electrode, an electrolyte and an air electrode, two opposite sides of each single cell being disposed downwardly so as to form a single cell having a reversed U-shaped cross-section, said single cells being seated on said separating plate with bent support portions of the single cells being held within the sealing grooves filled with a sealant and with a junction between the single cells being directly sealed by a sealant on the gas channels;
   a first collector positioned between each of said gas channels and an associated single cell;
   a second collector positioned on each of said single cells; and
   an insulating plate laid on said separating plate.

6. The solid oxide fuel cell stack structure according to claim 5, wherein the single cells are held on the separating plate by at least planar plates and foot bridge plates, gas channels of the same width and depth as those of at least planar plates and foot bridge plates being removed to form a plurality of fuel gas channels.

7. The solid oxide fuel cell stack structure according to claim 5, wherein the sealing grooves of said separating plate are interconnected together at least partially.

8. The solid oxide fuel cell stack structure according to claim 5, wherein said separating plate and said insulating plate are sealed at their junction by a sealant at positions around gas manifolds, at least a cross-shaped central portion and the whole of the insulating plate being removed in such manner that oxidizing gas channels between the single cells are not individually sealed.

* * * * *